United States Patent Office 3,135,861
Patented June 2, 1964

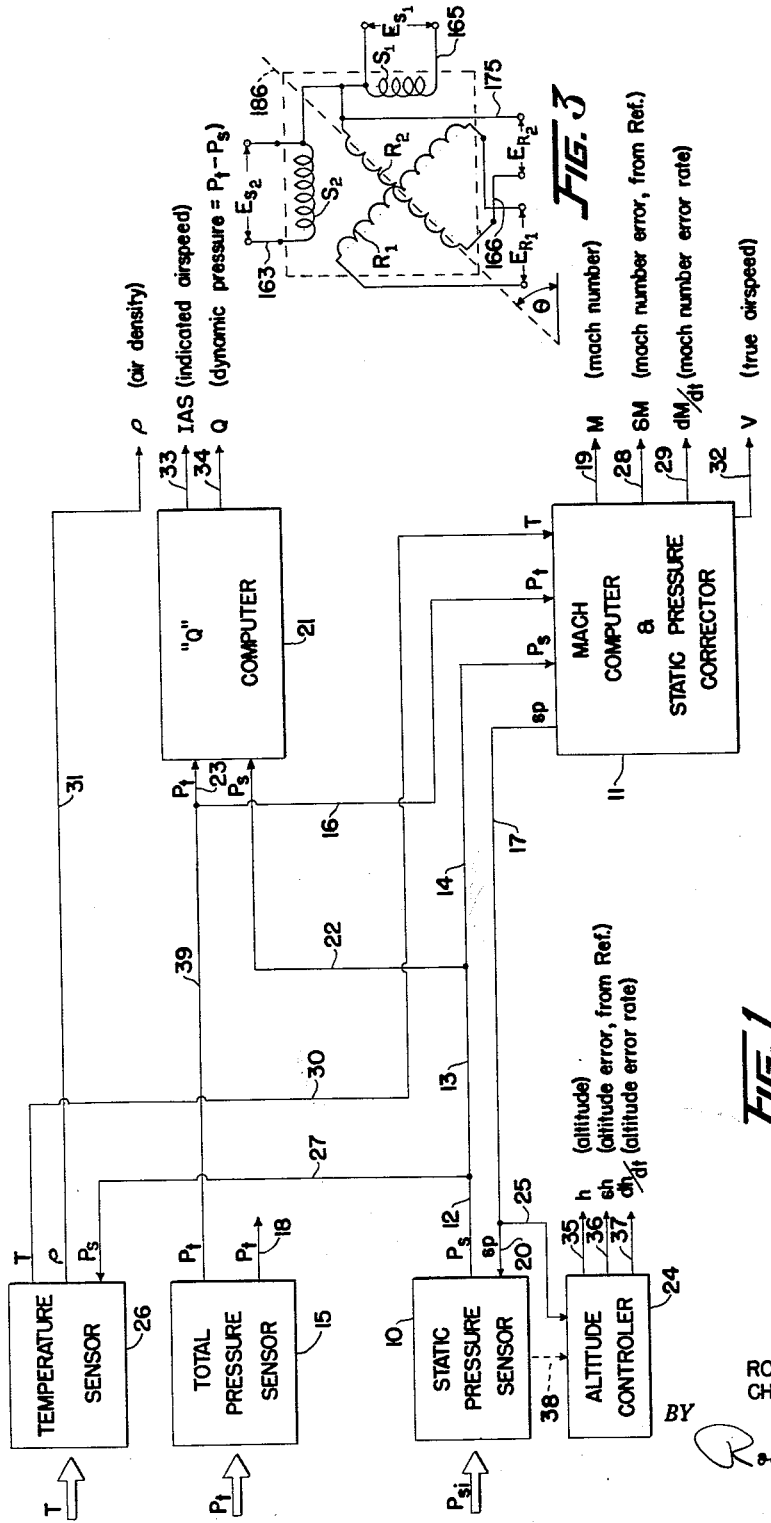

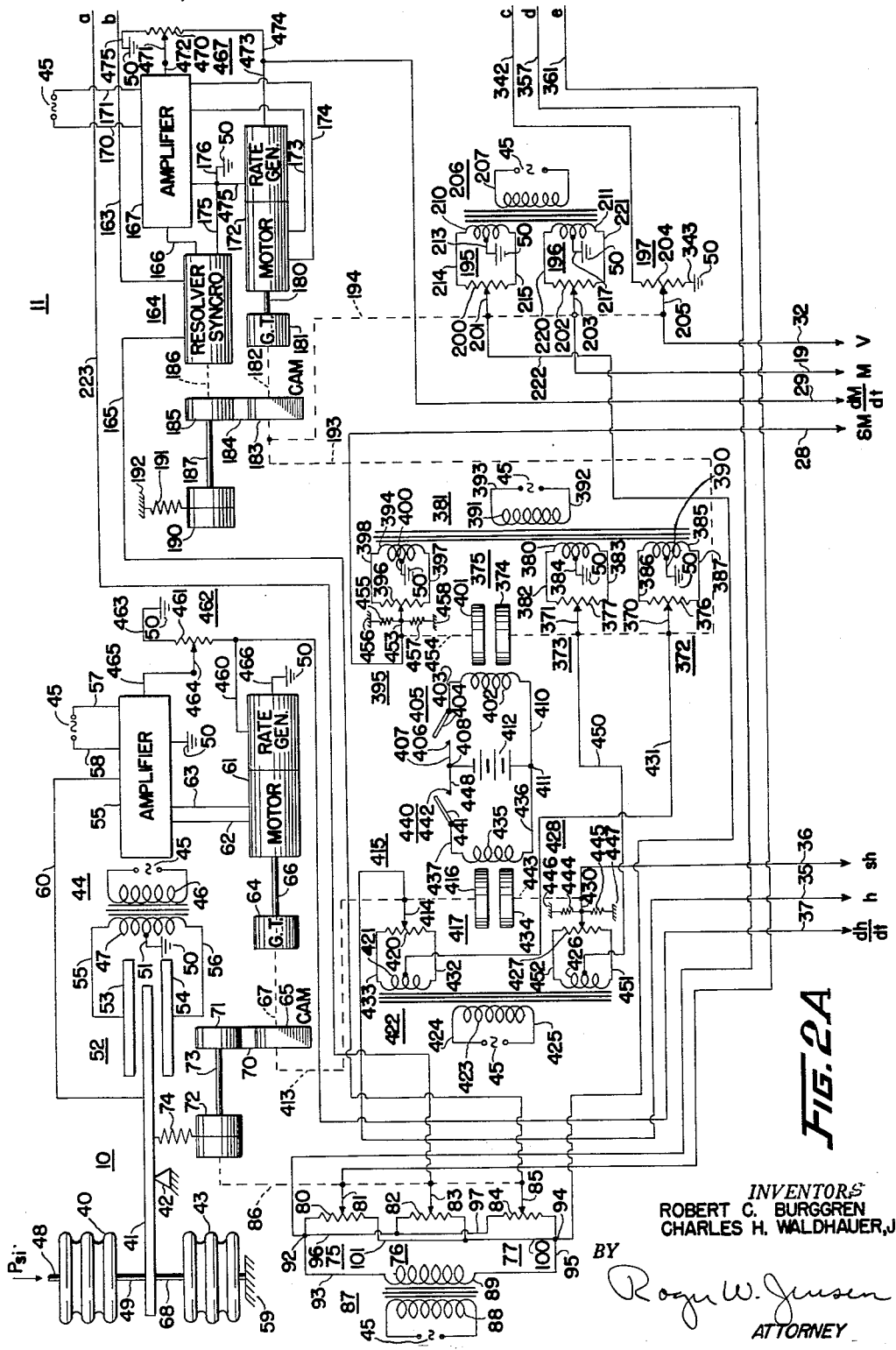

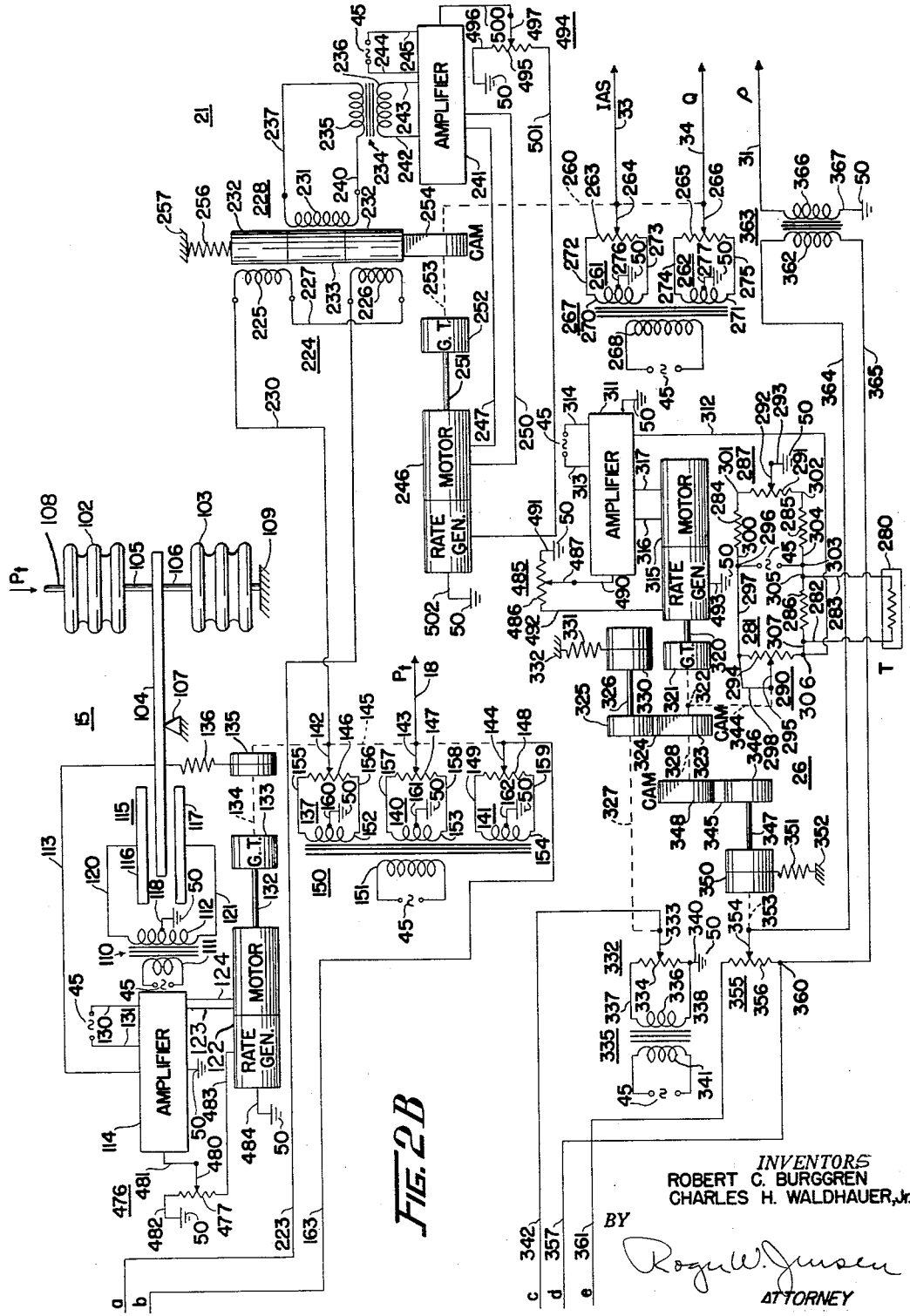

3,135,861
AIR DATA COMPUTING APPARATUS
Robert C. Burggren, Richfield, Minn., and Charles H. Waldhauer, Jr., Pacific Palisades, Calif., assignors to Minneapolis-Honeywell Regulator Company, Minneapolis, Minn., a corporation of Delaware
Filed Feb. 28, 1957, Ser. No. 643,100
8 Claims. (Cl. 235—151)

This invention relates to the field of airborne computers and more particularly to air data computer apparatus.

Generally, when aircraft are flown at speeds less than 200 m.p.h., the pressure sensitive devices carried thereon are not too susceptible to compressibility of the air in which they are flying. In fact for most cases, air moving at low speeds or slower than 200 m.p.h. may be treated as an incompressible fluid. However, when the speed of the aircraft is in excess of 200 m.p.h. the compressibility of the air must be taken into account to give accurate results of the pressure measuring devices. This is especially true when measuring static pressures at speed ranges of 200 m.p.h. and above.

Since jet power has now become a reality and speed ranges of fighter and interceptor aircraft have increased from the lower speeds to speeds in excess of the speed of sound, the compressibility of air as a retarding factor can no longer be considered negligible. That is, the molecules of air through which the aircraft was flying were easily pushed aside previously, but now at the higher speed ranges the molecules of air become compressed. This phenomena of compressibility first becomes evident in the form of weak detached shock waves which causes the air to pile up on the various surfaces of the aircraft. The static pressure orifice or inlet to the various instruments is greatly affected by this pile up of air and it seems logical that a correction be made for this compressibility of the air over the static pressure orifice.

A definite relationship of aircraft velocity to air pressure was probably first discovered by Daniel Bernoulli who stated in effect: "When the velocity of a fluid increases the pressure decreases and the pressure increases when the velocity decreases," and when the air tends to pile up on the various aircraft surfaces an error exists in the static pressure that is detected. Therefore, if a method can be found to compensate the free stream static pressure or indicated static pressure, the true static pressure may be obtained to give a correct signal which may be used in combination with other known quantities to produce corrective indications for the pilot and for other aircraft control apparatus.

Previously, a method of compensating for the pile up of air over the static pressure orifice was to locate the static pressure source on most aircraft a definite distance away from the air frame or to locate the static pressure source on the air frame, in an undisturbed region of the relative air stream.

One method to compensate for the compressibility of the air over the static pressure orifice is to compute a corrective error signal as a function of aircraft velocity. More recently this aircraft velocity has been referred to in terms of Mach number which may be defined as the ratio of the velocity of the aircraft to the speed of sound or the velocity of the air passing over the aircraft frame to the speed of sound.

The present invention employs a computer to compute the static pressure error due to compressibility of the air and combines this error with the indicated static pressure in a "boot strap" arrangement to give a corrected static pressure which may be used to compute other desired quantities which will be used in other aircraft instruments. The present invention utilizes electrical components to produce this corrective signal and combines this corrective signal electrically with other quantities to give an electrical output for the other controls or instruments to be attached to the aforementioned computer. To be more specific, the novelty of the computer comprises combining the indicated static pressure and total or pitot pressure electrically and computing an electrical corrective signal to be applied to the indicated static pressure signal to produce a corrected static pressure signal which is combined with total pressure and temperature to produce signals representative of the various quantities required in the operation of aircraft controls.

It is a general object of the present invention to provide improved means for providing a signal representative of corrected static pressure which may be combined with other signals for use with other airborne apparatus.

A further object of the invention is to provide a differential pressure device which has all input pressure signals combined electro-mechanically.

Another object of this invention is to provide a single instrument which may be used to provide pressure signals for navigation, fire control, bombing, and other aircraft systems avoiding duplication of the instruments.

Another object of this invention is to provide signals which are functions of corrected static pressure, dynamic pressure, and temperature.

Still another object of the invention is to provide an instrument which develops a signal representative of altitude deviation from a given reference and may be used to maintain an aircraft at a substantially constant altitude.

A further object of the invention is to provide an instrument which develops a signal representative of Mach number deviation from a given reference and will maintain an aircraft at a substantially constant Mach number.

These and other features of the invention will be understood more clearly and fully from the following detailed description and accompanying drawings in which:

FIGURE 1 is a schematic block diagram exhibiting in generalized form the components used to provide a computer to compute necessary quantities from air data, FIGURE 2a is a circuit diagram showing a typical design that may be employed in a static pressure sensor and static pressure error corrector, FIGURE 2b is a circuit diagram showing a typical total pressure sensor, temperature sensor, and differential pressure computer, FIGURE 3 is a schematic diagram of a conventional electrical resolver, FIGURES 2a and 2b, when connected, show one typical air data computer comprising the aforementioned components.

Referring to FIGURE 1, an apparatus to provide air data signals is shown comprising condition responsive means 10, 15, and 26 and two computing devices 11 and 21. A static pressure sensor 10 is shown which has an input signal of $P_{sI}$ and produces a signal representative of indicated static pressure $P_{sI}$ which is sent to a Mach computer through three connecting means 12, 13 and 14. Condition responsive means 15 is a total pressure sensor which has an input signal of $P_t$ and generates a signal representative of total pressure $P_t$ which is connected to Mach computer and static pressure corrector 11 by connecting means 39 and 16. The total pressure signal $P_t$ and indicated static pressure signal $P_{sI}$ are then combined in the Mach computer and static pressure corrector 11 to provide an output signal $\delta p$, which is connected to static pressure sensor 10 through a pair of connecting means 17 and 20. The $\delta p$ or static pressure correction signal is then combined with the indicated static pressure signal $P_{sI}$, which is again sent to the Mach computer and static pressure corrector 11 through connecting means 12, 13 and 14 providing a bootstrap circuit arrangement which develops a corrected static pressure signal $P_s$. The corrected static pressure signal $P_s$ is also connected to a "Q" computer 21 through connecting means 12, 13 and 22. "Q" is generally defined as the difference in pressure between total pressure $P_t$ and corrected static pressure sensor $P_s$. The total pressure is connected to the "Q" computer 21 through connecting means 39 and 23. "Q" computer 21 then provides two signals at its output which are: indicated air speed IAS presented on an output connecting lead 33 and total pressure $P_t$ minus corrected static pressure $P_s$ presented on an output connecting lead 34. An altitude controller 24 is connected to static pressure sensor 10 through a pair of suitable electrical connecting means 20 and 25 and a mechanical connecting means 38 to provide output signals representative of altitude $h$, which is presented on an output connecting lead 35; altitude error rate $dh/dt$, which is presented on an output connecting lead 37; and altitude displacement error from a given reference $\delta h$, which is presented on an output connecting lead 36. Total pressure sensor 15 also has an output signal representative of total pressure $P_t$, which is presented on an output connecting lead 18. A temperature sensor 26 has an input signal of T and is connected to static pressure sensor 10 through connecting means 12 and 27. Temperature sensor 26 provides a signal T, representative of the free stream air temperature and the temperature signal is T applied to Mach computer and static pressure corrector 11 through connecting means 30. The temperature T is then combined with a function of Mach number in the Mach computer and static pressure corrector 11 to provide a signal representative of true airspeed V, which is presented on an output connecting lead 32. The Mach computer and static pressure corrector 11 also provide signals representative of Mach number M, which is presented on an output connecting lead 19; of Mach number error rate $dM/dt$, which is presented on an output connecting lead 29; and Mach number error from a given reference $\delta M$, which is presented on an output connecting lead 28. Again referring to temperature sensor 26, the corrected static pressure signal $P_s$ which was connected to temperature sensor 26 through connecting means 12 and 27 is combined with temperature T, to give an output signal through connecting means 31 to provide a signal $\rho$, representative of air density. Total pressure $P_t$ is further provided as an output signal on output connecting lead 18 from total pressure sensor 15.

Now referring to FIGURE 2a, static pressure sensor 10 is shown which has as its input indicated static pressure $P_{si}$. The indicated static pressure $P_{si}$ is received in a bellows 40 through an inlet tube 48 which causes a force to be exerted through a flexible arm 49 against a lever arm 41 which is supported at a fulcrum point 42. Lever arm 41 also has a force exerted on it through a flexible arm 68 by a bellows 43 which is generally evacuated and fixed at one end as at point 59 to be used as a reference. A transformer 44 has a primary winding 46 which is excited by an alternating voltage source 45. A secondary winding 47 of transformer 44 is center tapped and connected to ground point 50 through connecting means 51. A capacitor 52 is made up of two stationary plates 53 and 54 and a movable plate which is the extreme end of lever arm 41. The capacitor plates 53 and 54 are connected to the two ends of transformer secondary winding 47 by a pair of leads 55 and 56. An amplifier and discriminator 55 has alternating voltage source 45 applied to it through a pair of connecting leads 57 and 58. As an indicated static pressure signal is received from the static pressure source, bellows 40 is actuated and causes lever arm 41 to move and thereby creates a change in the capacitive reactance seen on lever arm 41. This change in capacitive reactance then provides a signal of a phase and magnitude which is representative of the sense and magnitude of the change of indicated static pressure and is sent to amplifier 55 through a connecting lead 60. Amplifier 55 is connected to a motor-generator combination 61 through a pair of connecting leads 62 and 63. Due to the unbalance signal sent to the amplifier and discriminator 55, motor-generator combination 61 will commence to rotate an output shaft 66 and a gear train 64, a shaft 67 and a cam 65 connected to shaft 66. Motor-generator combination 61 is of the conventional alternating current, split phase motor type, connected in combination with a rate generator which supplies an alternating current signal output. Cam 65 must provide a signal representative of altitude as a function of indicated static pressure and therefore has cut on its surface, values of altitude as a function of indicated static pressure. Wound around cam 65 is a metal tape 70 which is used to drive a pair of pulleys 71 and 72 interconnected by a shaft 73. A spring 74 is fastened around pulley 72 and is connected to lever arm 41. Since cam 65 drives pulley 71 through metal tape 70 and has altitude cut on the cam surface as a function of indicated static pressure, pulley 71 is positioned linearly with indicated static pressure. This means that pulley 72 is also positioned linearly with indicated static pressure and allows a force rebalance to occur through spring 74 which is attached to lever arm 41 to reposition lever arm 41 to the center of the capacitor plates 53 and 54. Thus a signal will be picked up on lever arm 41 and transmitted through connecting lead 60 to amplifier 55 which will drive the motor-generator combination 61 until lever arm 41 is rebalanced. Three potentiometers 75, 76, and 77 comprise resistance elements 80, 82, and 84 and movable contact arms 81, 83, and 85 respectively. Movable contact arms 81, 83, and 85 are connected by a common shaft 86 which is driven by pulley 72. A transformer 87 has a secondary winding 89, and a primary winding 88 which is energized by an alternating voltage source 45. One end of secondary winding 89 is connected to a junction 92 by means of a connecting lead 93 and the other end is connected to a junction 94 by a connection lead 95. A pair of leads 96 and 97 are used to connect one end of resistance element 82 of potentiometer 76, and one end of resistance element 84 of potentiometer 77 to junction point 92. One end of resistance element 80 is also connected to junction point 92. A pair of connecting leads 100 and 101 are used to connect the other ends of resistance element 80 of potentiometer 75 and resistance element 82 of potentiometer 76 to junction 94. The other end of resistance element 84 is also connected to junction point 94. Since shaft 86 connects movable contact arms 81, 83, and 85 unitarily, they will possess signals representative of indicated static pressure, $P_{si}$.

Referring now to FIGURE 2b, total pressure sensor 15 is shown which has total pressure $P_t$ as its input. The total pressure $P_t$ is received in a bellows 102 through an inlet tube 108 which causes a force to be exerted through an arm 105 against a lever arm 104 which is supported at a fulcrum point 107. Lever arm 104 also has a force exerted on it through an arm 106 by a bellows 103 which is generally evacuated for use as a reference and fixed at one end as at point 109. A transformer 110 has a primary winding 111 which is excited by alternating voltage source 45 and a secondary winding 112 which is center tapped to ground point 50 through connecting lead 118. A capacitor 115 is made up of two stationary plates 116 and 117 and a movable portion which is the extreme end of lever arm 104. The ends of transformer secondary winding 112 are connected to stationary capacitor plate 116 through connecting lead 120 and to capacitor plate 117 through connecting lead 121. With voltage applied to transformer 110, if the lever arm 104 is in the center position between capacitor plates 116 and 117, the capacitive reactance will be balanced and the voltage output which would be sensed by lever arm 104 and applied through a connecting lead 113 to an amplifier discriminator 114, would be substantially zero. However, if the lever arm 104 is not in the center of the capacitor plates, a signal will be sent through connecting lead 113 to amplifier discriminator 114 which will have a definite phase relationship and magnitude to cause the output signal from the amplifier to drive a motor-generator combination 122. The motor-generator combination 122 is energized from amplifier 114 by a pair of connecting leads 123 and 124. Alternating voltage source 45 is also applied through a pair of connecting leads 130 and 131 to amplifier 114. Motor-generator combination 122 includes an output shaft 132 to drive a gear train 133, which in turn positions a shaft 134 and a pulley 135. Pulley 135 has attached thereto a spring 136 which is connected to lever arm 104. Since the lever arm 104 is positioned by dynamic or total pressure $P_t$, the electrical signal which energizes motor-generator combination 122 and repositions spring 136 is also representative of total pressure $P_t$ which changes the force applied by spring 136 and causes a rebalance of the system.

A transformer 150 has a primary winding 151 energized by alternating voltage source 45 and three secondary windings 152, 153, and 154. Three potentiometers 137, 140, and 141 are provided and have their respective movable contact arms 142, 143, and 144 adjusted by a common shaft 145 which is connected to pulley 135. Potentiometer 137 has a resistance element 146 connected to secondary winding 152 by connecting leads 155 and 156; potentiometer 140 has a resistance element 147 connected to secondary winding 153 by connecting leads 157 and 158; and potentiometer 141 has a resistance element 148 connected to secondary winding 154 by connecting leads 149 and 159. Secondary windings 152, 153, and 154 are center tapped to ground point 50 through their respective connecting leads 160, 161, and 162. With the above described arrangement, a signal representative of total pressure $P_t$, is present on potentiometer movable contact arms 142, 143, and 144 and an output signal representative of total pressure $P_t$, is presented on output connecting lead 18 which is connected to movable contact arm 143. An electrical signal representative of total pressure $P_t$ is transferred from potentiometer movable contact arm 144 by connecting lead 163 which leads to a drawing reference letter "b" in FIGURE 2b which corresponds to drawing reference "b" in FIGURE 2a and thence to an electrical resolver 164. Electrical resolver 164 in FIGURE 2a which is shown in more detail in FIGURE 3 may be of the type shown schematically in FIGURE 1a of the H. M. James Patent 2,715,274, entitled "Compound Resolver Computer." Electrical resolver 164 contains a pair of stator windings $S_1$ and $S_2$ which are placed at right angles to each other, and a pair of rotatable secondary windings $R_1$ and $R_2$ which are similarly disposed at right angles to each other. The stator and rotor windings have a one to one turns ratio. As described, rotor windings $R_1$ and $R_2$ are rotatable to a given angle $\theta$ with respect to a reference, and will have output voltages which are functions of the input voltages at stator windings $S_1$ and $S_2$ according to the following relationship:

$$E_{R1}=E_{S1} \cos \theta + E_{S2} \sin \theta$$
$$E_{R2}=-E_{S1} \sin \theta + E_{S2} \cos \theta$$

However, only $R_2$ of the rotor windings is used and the rotor output voltage will be equal to $$-E_{S1} \sin \theta + E_{S2} \cos \theta$$

By equating this value of voltage to zero, which would occur at the null point, we may obtain the relationship of $E_{S2}/E_{S1}=\tan \theta$. Therefore, theta equals the angle whose tangent is $$\frac{E_{S2}}{E_{S1}}$$

and if we allow $E_{S2}$ to equal total pressure $P_t$, and $E_{S1}$ to equal indicated static pressure $P_{si}$, then the angle the resolver synchro rotor is rotated through is proportional to the ratio of total pressure to indicated static pressure.

FIGURE 3 also shows a mechanical connection or shaft 186 which is used to rotate rotor $R_2$. It further shows connecting leads 165, 166, and 175, and internal connections used to give the resolver the proper reference with respect to ground.

Referring again to FIGURE 2a, connecting lead 165 connects movable contact arm 85 of potentiometer 77 to electrical resolver 164. Since potentiometer movable contact arm 85 is positioned by shaft 86 in accordance with the value of indicated static pressure $P_{si}$, and since movable contact arm 144 in FIGURE 2b is positioned by shaft 145 in accordance with the value of total pressure $P_t$, there exists in resolver synchro 164, signals representative of indicated static pressure and total pressure. Resolver 164 will therefore have an output voltage which will be present on lead 166 and be presented to an amplifier 167. Amplifier 167 is further energized by alternating voltage source 45 through a pair of connecting leads 170 and 171. The amplifier has an output signal which is both phase sensitive and varying in magnitude and this signal is sent to a motor-generator combination 172 through a pair of connecting leads 173 and 174. Electrical resolver synchro 164 has one end of resolver rotor winding $R_2$ and one end of stator windings $S_1$ and $S_2$ connected to ground point 50 by connecting leads 175 and 176. Rotation of motor-generator combination 172 is transmitted through an output shaft 180, a gear train 181 and a gear train output shaft 182 to position a cam 183. Cam 183 can best be described as having the aircraft Mach number cut on its surface as a function of the ratio of dynamic pressure $P_t$ to indicated static pressure $P_{si}$. For a Mach number in the supersonic range, cam 183 may be shaped according to the following formula:

$$\frac{P_t}{P_{si}}=\left[\frac{(K+1)M^2}{2}\right]^{\frac{K}{K-1}} \left[\frac{2KM^2}{K+1}-\frac{K-1}{K+1}\right]^{\frac{1}{1-K}}$$

where:

$M=$Mach number
$K=$ratio of specific heat for air, $C_p/C_v$

As cam 183 is rotated, it moves a metal tape 184 which is wound around cam 183 and around a pulley 185. As pulley 185 rotates, it rotates shaft 186 and a second shaft 187 so that resolver synchro 164 is driven until it reaches its null point. A pulley 190, which is driven by shaft 187 has a spring 191 attached thereto and fastened to a rigid point 192 for the purpose of keeping metal tape 184 under tension and for removing any back lash in gear train 181. As shaft 182 rotates, positioning cam 183, it also adjusts a pair of shafts 193 and 194. Three movable contact arms 201, 203, and 205 of three potentiometers 195, 196, and 197 respectively are attached to a common shaft 194. Each of the potentiometers has a resistance element with potentiometer 195 having a resistance element 200; potentiometer 196 having a resistive element 202; and potentiometer 197 having a resistance element 204. Potentiometers 195 and 196 have attached to their respective resistance elements 200 and 202, a transformer 206 which has a primary winding 207 energized by alternating voltage source 45 and two secondary windings 210 and 211. Secondary winding 210 is center tapped to ground point 50 through a connecting lead 213, and is connected in parallel to resistance element 200 by a pair of connecting leads 214 and 215. Secondary winding 211 is center tapped to ground point 50 through a connecting lead 217 and is connected in parallel with resistance element 202 of potentiometer 196 by a pair of connecting leads 220 and 221. Potentiometer 195 is shown as having a linear resistance element 200, but element 200 may be characterized if necessary to produce a static pressure corrective signal which is a function of the Mach number. A characterized potentiometer would have other resistance elements connected in parallel with resistance element 200 to produce a resistance which would vary with Mach number to produce a corrective static pressure signal. This corrective static pressure signal δp is connected to common junction point 94 and potentiometer movable contact arm 201 through a connecting lead 222. Since this corrective signal is sent to junction point 94 it is then combined with the signal which is present on resistance element 84 of optentiometer 77 and is transmitted by movable contact arm 85 and connecting lead 165 back to electrical resolver 164. This completes a boot strap type circuit which will cause motor-generator combination 172 to drive to a null position which is representative of corrected static pressure $P_s$. Since junction point 94 is connected to potentiometer 76 and 75 through connecting leads 100 and 101, a corrected static pressure $P_s$ will appear on movable contact arms 81 and 83.

If the corrected static pressure signal $P_s$ which is present on movable contact arm 83 is sent to "Q" computer 21 in FIGURE 2b by a connecting lead 223 which leads to a drawing reference letter "a" in FIGURE 2a and from a similar reference letter in FIGURE 2b to the "Q" computer 21, a signal representative of corrected static pressure will be presented to a differential transformer 224 in FIGURE 2b. Differential transformer 224 consists of two primary windings 225 and 226 of which 226 is connected to lead 223. The opposite end of primary winding 226 is connected to one end of primary winding 225. The opposite end of primary winding 225 is connected to movable contact arm 142 of potentiometer 137 by a connecting lead 230. Differential transformer 224 is further made up of a secondary winding 231 and a movable core 228 which is constructed of a suitable nonmagnetic and non-conducting material 232 and a suitable magnetic material which may be of a powdered magnetic material or a solid metal 233. This type of transformer is well known to those familiar with the art and may be of the type shown in the W. D. MacGeorge Patent, 2,427,866. Differential transformer 224 therefore has a signal representative of dynamic or total pressure $P_t$ presented on lead 230 and a signal representative of corrected static pressure $P_s$ presented on lead 223 to give a combined signal which will be induced into secondary winding 231 to provide a signal which will be a differential pressure signal or in other words the difference between the total pressure $P_t$ and the corrected static pressure $P_s$. An impedance matching transformer 234 is provided which has a primary winding 235 and a secondary winding 236, the primary winding being connected to the secondary winding of differential transformer 224 by a pair of connecting leads 237 and 240. The secondary winding of impedance matching transformer 234 is connected to an amplifier 241 by two connecting leads 242 and 243. Impedance matching transformer 234 is used to correct the impedance mismatch between amplifier 241 and secondary winding 231 of differential transformer 224, thereby reducing the error in the linear output. Amplifier 241 is also energized by alternating voltage source 45 through a pair of connecting leads 244 and 245. Thus it may be seen that amplifier 241 is energized by a signal which is representative of pressure differential and this signal is sent to a motor-generator combination 246 through a pair of connecting leads 247 and 250. As motor-generator combination 246 is rotated, a connecting shaft 251 positions a gear train 252, a shaft 253, and a cam 254. Cam 254 acts against the non-magnetic conducting material 232 on one end to cause movable core 228 to be displaced and thereby change the inductance between coils 225, 226 and 231. Cam 254 is shaped such that the output voltage from secondary winding 231 caused by the displacement of core 228, is a linear function of cam rotation. In order that movable core 228 follows cam 254 without being affected by accelerations, vibrations, or unanticipated movement, a spring 256 is used to exert a force on the end of movable core 228 opposite the end positioned by cam 254. Spring 256 is fixed rigidly at a point 257. Thus, cam 254 will position the movable core until the signal appearing on secondary winding 231 is at its null position and causes motor-generator combination 246 to stop rotating. As shaft 253 rotates and positions cam 254, it also turns a shaft 260 which adjusts a pair of movable contact arms 264 and 266 of potentiometers 261 and 262 respectively. Besides the movable contact arms, potentiometers 261 and 262 comprise resistance elements 263 and 265 respectively. Common shaft 260 then adjusts movable contact arms 264 and 266 to a position representative of pressure differential or $P_t - P_s$. A transformer 267 has a primary winding 268 energized by alternating voltage source 45 and two secondary windings 270 and 271. Winding 270 is connected to resistance element 263 by two connecting leads 272 and 273, and winding 271 is connected to resistance element 265 by a pair of connecting leads 274 and 275. Secondary winding 270 is center tapped to ground point 50 by a connecting lead 276 and secondary winding 271 is connected to ground point 50 through a connecting lead 277. Thus, there are outputs presented on lead 33 which is representative of indicated air speed IAS, and on lead 34 which is representative of pressure differential or $P_t - P_s$.

Referring to temperature sensor 26 in the lower central portion of FIGURE 2b, a sensing element 280 is connected to a bridge 281 by two connecting leads 282 and 283. The sensing element 280, is a temperature sensitive resistance which causes the resistance of the element to vary proportional to temperature T. Bridge 281 is energized by alternating voltage source 45 at two junction points 296 and 303, and consists of three resistors 284, 285, and 286, and two potentiometers 287 and 290. Potentiometer 287 is made up of a resistance element 291 and a movable contact arm 292 which is connected to ground point 50 by a connecting lead 293. Potentiometer 290 comprises a resistance element 294 and a movable contact arm 295. The bridge 281 is completed by connecting one end of resistance 294 to a junction point 296 by a connecting lead 297 and to movable contact arm 295 by a connecting lead 298, and from junction point 296 to resistor 284 by a connecting lead 300. The opposite end of resistor 284 is connected to one end of resistance element 291 by a connecting lead 301 and the opposite end of resistance element 291 is connected to resistor 285 by a connecting lead 302. The opposite end of resistor 285 is connected to a junction point 303 by a connecting lead 304 and junction point 303 is connected to resistor 286 by a connecting lead 305. The opposite end of resistor 286 is connected to resistance element 294 at a common junction point 306 by a connecting lead 307. Resistor 286 is connected in parallel with resistance element 280 by connecting leads 282 and 283. Potentiometer movable contact arm 292 may be adjusted manually to balance the bridge circuit for a predetermined temperature. As resistance element 280 is varied in resistance by the temperature, the bridge will become unbalanced and a signal representative of the temperature T will be presented at junction point 306 and connected to an amplifier 311 by a connecting lead 312. Amplifier 311 is further energized by an alternating voltage source 45 which is connected to amplifier 311 by two connecting leads 313 and 314. The signal presented to amplifier 311 by connecting lead 312 is then representative of temperature and the output signal from the amplifier will be representative of temperature, causing a motor-generator combination 315 to be driven to a new position since it is energized with the temperature signal through a pair of leads 316 and 317. As motor-generator combination 315 rotates, it rotates a shaft 320, a gear train 321, a shaft 322, a cam 323 and a shaft 328. Cam 323 has the square root of temperature cut on its surface. Car 323 has wound on its surface a metal tape 324, which is used to position a pulley 325, a shaft 326, a shaft 327, and a pulley 330. Attached to pulley 330 is a spring 331 which is rigidly fixed to a point 332 and is used to keep metal tape 324 under tension and to remove any back lash in gear train 321. Since a square root function of temperature is present on shaft 327, this function will be present on a movable contact arm 333 of potentiometer 332, which has a resistance element 334 connected to a secondary winding 336 of a transformer 335 by two connecting leads 337 and 338. Connecting lead 338 is grounded at point 50 by a connecting lead 340. Transformer 335 has a primary winding 341 which is energized by an alternating voltage source 45. Therefore, movable contact arm 333 has a signal representative of the square root of temperature present which is sent to Mach computer and static pressure corrector 11 in FIGURE 2a by a connecting lead 342 which leads to drawing reference letter "c" in FIGURE 2b and from a similar reference letter in FIGURE 2a to the Mach computer and static pressure corrector 11. Connecting lead 342 is connected to one end of resistance element 204 of potentiometer 197 and the opposite end of resistance element 204 is connected to ground point 50 through a connecting lead 343. Since movable contact arm 205 is positioned by a function of Mach number, the output signal which is presented on connecting lead 32 gives a signal representative of true air speed, V.

Referring once again to temperature sensor 26, in FIGURE 2b, shaft 322 which is rotated as a function of temperature, positions a shaft 344 which in turn positions movable contact arm 295 to rebalance bridge 281 so as to produce a null voltage at junction point 306 and thereby cause the motor-generator combination 315 to go to a null position. As shaft 322, cam 323, and shaft 328 are rotated, a cam 348 is also rotated. Cam 348 has the reciprocal of temperature cut on its surface and it has wound on its surface a metal tape 345 which is used to position a pulley 346. Pulley 346 has connected to it a shaft 347, and a pulley 350. A spring 351 is attached to pulley 350 and has one end fixed at a point 352. The spring 351 which is wound around pulley 350 is used to keep metal tape 345 under tension and to reduce back lash in gear train 321. Attached to puley 350 is a shaft 353 which positions a movable contact arm 354 of a potentiometer 355. Potentiometer 355 is also made up of a resistance element 356 to which is attached a connecting lead 357 at a junction point 360. Connecting lead 357 leads to a drawing reference letter "d" in FIGURE 2b and from a similar reference letter in FIGURE 2a is further connected to junction point 92 on static pressure sensor 10. Movable contact arm 81 has a connecting lead 361 attached thereto which leads to a drawing reference letter "e" in FIGURE 2a and from a similar reference letter in FIGURE 2b is connected to resistance element 356 of potentiometer 355 on the end opposite junction 360. Therefore, since movable contact arm 81 in FIGURE 2a is positioned by indicated static pressure $P_{si}$ through shaft 86, and has added to it a corrective pressure signal $\delta p$ at junction 94, which in turn is connected to resistance element 80 by connecting lead 100 and 101, a signal representative of corrected static pressure $P_s$ is then presented to resistance element 356 of potentiometer 355 in FIGURE 2b by connecting lead 361 and 357. As movable contact arm 354 is positioned by the reciprocal of temperature, a signal representative of pressure density $\rho$ between junction point 360 and potentiometer wiper arm 354 is conveyed to a secondary winding 362 of a transformer 363 through two connecting leads 364 and 365. Transformer 363 has a secondary winding 366 which has one side of the winding connected to ground point 50 by a connecting lead 367. Transformer 363 is used as an isolation transformer to give the pressure density $\rho$ signal a reference to ground and the signal output from secondary winding 366 is provided on an output connecting lead 31. Thus, output connecting lead 31 has a signal representative of pressure density presented as an output.

Referring now to Mach computer and static pressure sensor 11 and more particularly to shaft 193 in FIGURE 2a, it will be noted that shaft 193 adjusts a pair of potentiometer movable contact arms 370 and 371 of a pair of potentiometers 372, 373 respectively, and further rotates a disk 374 of a magnetic clutch 375. Potentiometer 372 has a resistance element 376 and potentiometer 373 has a resistance element 377. Resistance element 377 of potentiometer 373 is connected to a transformer secondary winding 380 of a transformer 381 by two leads 382 and 383. Transformer secondary winding 380 is also center tapped to ground point 50 by a connecting lead 384. Transformer secondary winding 385 is connected to potentiometer resistance element 376 by a pair of connecting leads 386 and 387. Transformer secondary winding 385 is further connected to ground point 50 by a connecting lead 390. Transformer 381 has a primary winding 391 which is connected to an alternating voltage source 45 by two connecting leads 392 and 393. A third secondary winding 394 of transformer 381 is connected to a potentiometer 395 by connecting a resistance element 396 of potentiometer 395 to transformer secondary winding 394 by a pair of connecting leads 397 and 398. Tranformer secondary winding 394 is also center tapped to ground 50 by a connecting lead 400. Clutch 375 has another disk 401 and an energizing coil 402. Attached to clutch coil 402 by a connecting lead 403, is a movable portion 404 of a switch 405. Switch 405 has a fixed contact 406 which is connected to a junction point 408 by a connecting lead 407. Attached to the other end of clutch coil 402 is a connecting lead 410 which terminates at a junction 411. Connected between junction points 408 and 411 is a battery 412 or other suitable voltage means.

Returning now to static pressure sensor 10, shaft 67 positions cam 65, a shaft 413, a movable contact arm 414 of a potentiometer 415 and a movable disk 416 of a clutch 417. Potentiometer 415 also has a resistance element 420 which is connected to a transformer secondary winding 421 of a transformer 422 by two connecting leads 432 and 433. Transformer 422 has a primary winding 423 which is excited by an alternating voltage source 45 and is connected thereto by a pair of connecting leads 424 and 425. Transformer 422 has another secondary winding 426 which is connected to a resistive portion 427 of a potentiometer 428 by two connecting leads 451 and 452. Potentiometer 428 also has a movable contact arm 430. Since cam 65 is rotated in accordance with altitude, which is a function of static pressure, potentiometer movable contact arm 414 is also positioned with respect to altitude but needs a correction to give the correct altitude of the aircraft.

Referring once again to shaft 193 of Mach computer and static pressure corrector 11, potentiometer movable contact arm 370 is positioned by Mach number and has an output which is equal to an altitude corrective signal which is a function of the Mach number, and this is connected from movable contact arm 370 to a center tap on transformer secondary winding 421 by a connecting lead 431. Thus, a corrected altitude signal $h$, is provided on potentiometer movable contact arm 414 and output connecting lead 35. Clutch 417 has a second disk 434 and a coil 435, to which is attached a connecting lead 436 to junction point 411 and a connecting lead 437 which is connected to a movable portion 441 of a switch 440. A connecting lead 448 connects junction point 408 to a fixed contact point 442 of switch 440.

Upon making contact between movable portion 441 of switch 440 and fixed contact 442, the magnetic clutch disks 416 and 434 make contact thereby transferring the shaft rotation of shaft 413 to a second shaft 443. Shaft 443 then positions movable contact arm 430 which has attached thereto, a pair of springs 444 and 445 which are fastened to a pair of fixed points at 446 and 447 respectively. Since a signal is present on potentiometer movable contact arm 371 of potentiometer 373 which is representative of a correction signal for altitude as a function of Mach number, this signal will be combined at transformer secondary winding 426 by a connecting lead 450 to give a signal representative of true altitude deviation. Thus a signal which is representative of altitude deviation $\delta h$ from a given reference is presented on movable contact arm 430 and output signal connecting lead 36. This will be more fully explained later in the specification.

Referring to switch 405, upon making contact between movable portion 404 of the switch and fixed contact 406, coil 402 is energized causing magnetic clutch disks 401 and 374 to make contact and thereby causing the clutch to rotate unitarily with shaft 193 so as to position a shaft 454 and a movable contact arm 453 of potentiometer 395. Movable contact arm 453 has attached thereto, a spring 455 which is rigidly fixed at a point 456 and a spring 457 which is rigidly fixed at a point 458. Thus there is a signal presented on movable contact arm 453 which is representative of Mach number deviation $\delta M$ from a given reference point, which is presented as an output signal on connecting lead 28. This operation will also be more fully described later in the specification.

Returning now to shaft 194 of Mach computer and static pressure corrector 11, it will be noted that movable contact arm 203 which is positioned by Mach number will then present an electrical output signal which is representative of the Mach number on connecting lead 19.

With reference to static pressure sensor 10 and motor-generator combination 61, a signal representative of altitude rate $dh/dt$ is presented to amplifier 55 by a network comprising a connecting lead 460 which is attached to one end of a resistance element 461 of a potentiometer 462, a movable contact arm 464 which is manually adjusted across resistance element 461, and a connecting lead 465. The opposite end of resistance element 461 is connected to ground point 50 through a connecting lead 463. Potentiometer 462 is used to prevent hunting by the motor and is more commonly called a sensitivity control. The altitude rate signal is referenced to ground by a connecting lead 466 between motor-generator combination 61 and ground point 50. A signal representative of altitude rate $dh/dt$ is then obtained as an output signal on output connecting lead 37 which is attached to the junction point of connecting lead 460 and resistance element 461 of potentiometer 462.

Referring to Mach computer and static pressure corrector 11, potentiometer 467 has a resistance element 470 and a movable contact arm 471 of which contact arm 471 is connected to amplifier 167 by a connecting lead 472. Resistance element 470 has one end connected to ground point 50 by a connecting lead 475. Connecting lead 473 and a second connecting lead 474 connect motor-generator 172 to resistance element 470, the opposite end of resistance element 470 being connected to ground point 50 by a connecting lead 475. Thus a signal representative of Mach number rate $dM/dt$ is sent to amplifier 167 which is used to prevent hunting by the motor and is generally called a sensitivity control. An output signal representative of Mach number rate $dM/dt$ is obtained by attaching output connecting lead 29 to the junction point of leads 473 and 474.

In regard to total pressure sensor 15 in FIGURE 2b, a potentiometer 476 is shown comprising a resistance element 477 and a movable contact arm 480 which is connected to amplifier 114 by a connecting lead 481. Resistance element 477 has one end connected to ground point 50 by a connecting lead 482 and the opposite end of resistance element 477 is connected to motor-generator combination 122 by a connecting lead 483. The circuit is completed by connecting the rate generator to ground point 50 by a connecting lead 484. Potentiometer 476 is also used to prevent hunting by the motor and is more commonly referred to as a sensitivity control.

Referring to temperature sensor 26, a potentiometer 485 comprising a resistance element 486 and a movable contact arm 487 is connected to amplifier 311 by a connecting lead 490. Resistance element 486 is connected on one end to ground point 50 by a connecting lead 491 and has the opposite end of resistance element 486 connected to motor-generator combination 315 by a connecting lead 492. The circuit is completed by connecting the motor-generator combination 315 to ground point 50 by a connecting lead 493. Potentiometer 485 is used to prevent hunting by the motor and is generally called a sensitivity control.

Referring now to "Q" computer 21, a potentiometer 494 has a resistance element 495 which is connected to ground point 50 by a connecting lead 496. The circuit is completed by connecting a movable contact arm 497 of potentiometer 494 to amplifier 241 by a connecting lead 500 and by connecting motor-generator combination 246 to resistance element 495 by a connecting lead 501 opposite the end which is grounded. The circuit is further completed by connecting motor-generator combination 246 to ground point 50 by a connecting lead 502. Potentiometer 494 is used to prevent hunting by the motor and is more commonly called a sensitivity control.

The three condition responsive components 10, 15 and 26 along with the two computing components 11 and 21 each comprise the basic elements of a servo-mechanism. In each of the components may be found an error measuring means or comparison device, a control means consisting of an amplifier and motor-generator combination and a load or signal producing means. In each of the components, the motor-generator combination is driven by a signal from the error measuring device until the error signal is eliminated or the error signal reaches a null point.

Amplifiers 55, 114, 167, 241 and 311 include a discriminator, amplifier section, and power supply and may be of the type shown in the Robert R. Chapman Patent 2,547,621. Also, motor-generator combinations 61, 115, 172, 246, and 315 may be of the type shown in the A. S. Riggs Patent 2,408,813.

Operation

In operation, static pressure sensor 10 senses the static pressure which applies a force to bellows 40. This force is opposed by bellows 43 to cause lever arm 41 to be unbalanced by a force and cause balance arm 41 to pivot about fulcrum point 42, thus changing the capacitance of capacitor 52 and thereby changing the capacitive reactance of the circuit made up of transformer 44 and capacitor 52. This unbalance is sensed by lead 60 which sends a signal to amplifier 55 and the amplifier in turn sends a signal to the motor-generator combination 61 through leads 62 and 63 causing motor-generator combination 61 to drive shaft 66, gear train 64, shaft 67, cam 65, shaft 413 and metal tape 70. The cam 65 which has tape 70 wound around it, rotates shaft and pulley combinations 72, 73, and 71 which in turn applies a rebalance force to lever arm 41 through spring 74. Thus, a signal representative of static pressure is presented as a shaft rotation of shaft 86 to reposition the movable contact arms of potentiometers 75, 76 and 77. The aforementioned potentiometers are all excited by transformer 87 and therefore have on their movable contact arms, a signal representative of indicated static pressure $P_{st}$. The indicated static pressure signal is taken from potentiometer 77 and sent to electrical resolver 164 by connecting lead 165 where the electrical signal energizes resolver 164. At the same time, a signal is produced at total pressure sensor 15 by having the dynamic or total pressure received at bellows 102. This produces a force on lever arm 104 which is opposed by a second force set up by the predetermined pressure in bellows 103 causing lever arm 104 to be repositioned about the fulcrum. As lever arm 104 is repositioned it changes the capacitive reactance in the circuit made up of capacitor 115 and transformer 110 so that a signal is sensed on connecting lead 113 and sent to amplifier 114. Motor-generator combination 115 receives the amplified signal through connecting leads 116 and 117 and rotates shaft 132, gear train 133, shaft 134, and pulley 135. As pulley 135 is rotated, it allows spring 136 to change the force applied to lever arm 104 and thereby allows the capacitive reactance to be balanced again and reposition arm 104 to its center position. As pulley 135 is rotated, potentiometers 137, 140 and 141 have their movable contact arms adjusted to a value which is representative of total pressure $P_t$. The potentiometers aforementioned are excited by voltage received from transformer 150 and a signal which is representative of total pressure $P_t$ is presented on output connecting lead 18. A signal representative of total pressure is sent to electrical resolver 164 through connecting lead 163. The signals are combined in electrical resolver 164 which produces an output voltage on connecting lead 166 which is a ratio of the total pressure to the static pressure and this voltage is sent to amplifier 167 which in turn sends a signal to motor-generator combination 172 by leads 173 and 174 to cause shaft 180, gear train 181, shaft 182, and cam 183 to be positioned to a new value. By machining cam 183 to give Mach number as a function of the pressure ratio just described, and winding a tape 184 about the cam and pulley 185, resolver 164 is repositioned by shaft 186 to cause the resolver to be driven to its null position. Since cam 183 positions resolver 164 as a function of Mach number, shafts 193 and 194 therefore are positioned with respect to Mach number and drive potentiometers 195, 196, 197, 372, 373, and clutch 375 when energized. By choosing a proper value for potentiometer 195, a static pressure correction signal $\delta p$ may be developed as a function of Mach number and this will be applied to junction point 94 by connecting lead 222 to correct potentiometers 75, 76, and 77, to give a corrected static pressure signal $P_s$ which in turn is sent to electrical resolver 164 through connecting lead 165. Thus the boot strap circuit is completed and will cause the resolver 164 to be repositioned until the signal appearing on connecting lead 165 is equal to the corrected static pressure $P_s$, assuming the total pressure signal $P_t$ appearing on connecting lead 163 remains constant.

Now if the signal which appears on contact arm 83 of potentiometer 76 is received at "Q" computer 21 via connecting lead 223 and a signal is received from potentiometer 137 via connecting lead 239, the signals of total pressure $P_t$ and corrected static pressure $P_s$ are present in differential transformer 224. A resultant differential pressure signal will then be sensed on its secondary lead 231 depending upon the relative position of the magnetic material 233 in the core and this signal will be sent to amplifier 241 through impedance matching transformer 234. Thus amplifier 241 has an output signal which is representative of pressure differential ($P_t - P_s$) and this signal is applied to motor-generator combination 246 by connecting leads 247 and 250. As motor-generator combination 246 is rotated, it rotates shaft 251, gear train 252, shaft 253, and cam 254. As cam 254 is repositioned, it changes the inductive coupling between primary windings 225 and 226 and secondary winding 231 of differential transformer 224 such that it is driven to a null signal. Therefore shaft 260, which is also driven by cam 254, is rotated as a function of differential pressure to adjust the movable contact arms on potentiometers 261 and 262 which are excited by transformer 267 to produce an output signal representative of indicated air speed IAS on output connecting lead 33 and a differential pressure signal "Q," which is presented on output connecting lead 34.

In order to get two other desired quantities, true air speed V, and pressure density P, it is necessary to combine temperature with the quantities just described and this will be done by showing the operation of temperature sensor 26. Connected in parallel with a bridge circuit 281 is a temperature probe 280, which has a resistance element connected in parallel with resistor 286 of the bridge circuit 281, and by applying voltage to the bridge circuit and having balancing potentiometer 287 at a predetermined point, a signal representative of temperature T will be received at junction point 306 and sent to amplifier 311 through connecting lead 312. This signal is amplified and sent through connecting leads 316 and 317 to motor-generator combination 315 to position shaft 320, gear train 321, shaft 322, cam 323, shaft 328 and cam 348. As shaft 322 is rotated it is mechanically connected by shaft 344 to potentiometer wiper arm 295 to rebalance the bridge circuit and cause the motor-generator combination 315 to drive to a null point, the null point being the temperature which is present at temperature probe 280. Cam 323 and cam 348 drive a pair of tapes 324 and 345 to position pulleys 325 and 346 respectively. Since cam 323 is machined to a function of the square root of temperature, shaft 327 adjusts movable contact arm 333 of potentiometer 332 to give a signal on connecting lead 342 which is representative of the square root of temperature when potentiometer 332 is excited by transformer 335 and alternating voltage source 45. The square root of temperature signal T will then be presented to potentiometer 197 whose shaft 194 is positioned by Mach number. The voltage appearing on potentiometer movable contact arm 205 is the square root of temperature multiplied by a function of the Mach number which is more easily recognized as true air speed V and it is presented on output connecting lead 32.

Since shaft 86 of static pressure sensor 10 positions movable contact arm 81 as a function of corrected static pressure, a signal representative of corrected static pressure $P_s$ is presented between movable contact arm 81 and junction point 92 to be sent to potentiometer 355 of temperature sensor 26 by connecting leads 357 and 361. Cam 346 has its surface machined to a reciprocal of temperature and therefore shaft 353 which is driven by pulley 350 positions movable contact arm 354 such that the signal appearing on connecting leads 364 and 365 will appear as a function of corrected static pressure $P_s$ and the reciprocal of temperature. This signal which appears at transformer 363 is used to reference the pressure density signal to ground and a pressure density signal P is presented on output connecting lead 31.

A corrective signal was used to correct the indicated static pressure signal in static pressure sensor 10, and it is also necessary to correct for the altitude signal which is presented on potentiometer 415 by rotation of shaft 413. The correction is obtained from potentiometer 372 of the Mach computer and static pressure corrector 11 which sends a corrective signal to potentiometer 415 by connecting lead 431 from potentiometer 372 which has its movable contact arm 370 positioned by shaft 193. Therefore, a signal representative of the indicated altitude plus a correction to give true altitude h, appears on movable contact arm 414 of signal device 415 and output connecting lead 35.

If it should be desired to operate the aircraft at a constant altitude or constant Mach number, this may be done by engaging appropriate switch 440 or switch 405 to give the desired function. By closing switch 440, clutch 417 is engaged which has movable contact arm 430 of potentiometer 428 at a neutral point or balance point which is predetermined by positioning springs 444 and 445. Thus the signal appearing on movable contact arm 430 which is excited by transformer 422 and alternating current source 45, will deviate from a given altitude to maintain the aircraft at that particular altitude and this signal is presented as a $\delta h$ signal on output connecting lead 36.

If it is desired that the aircraft be operated at a constant Mach number, engaging switch 405 actuates clutch 375 to position movable contact arm 453 which has been prepositioned by positioning spring 455 and 457 to a neutral point or balance point. Potentiometer 395 is excited by transformer 394 and alternating current source 45. Thus the signal that appears on movable contact arm 453 is a signal which deviates about a given Mach number and this signal is presented for Mach control on output connecting lead 28 as a $\delta M$ signal.

It is sometimes desired to have a signal which is representative of the rate of change of altitude and the rate of change of Mach number with respect to time and these two signals may be respectively obtained from motor-generator combination 61 and motor-generator combination 172. Motor-generator combination 61 supplies a rate signal which is also used as an anti-hunt or damping signal to be supplied to amplifier 55, and this signal is presented on output connecting lead 37 as a signal which is representative of rate of change of altitude with respect to time or altitude rate, $dh/dt$.

Referring now to motor-generator combination 172, a signal is presented which is representative of rate of change of Mach number with respect to time or Mach rate and this signal is also used to prevent anti-hunt or act as a damping signal on motor-generator combination 172 and is presented on output connecting lead 29 as a Mach rate, $dM/dt$.

Each amplifier has its own sensitivity control in the form of potentiometers 462, 467, 477, 494 and 485 which are used to control the rate of feedback and is referenced to ground point 50.

While it has been shown that there are a plurality of transformers used in this air data computer, it could equally well be shown that a single transformer would be used with a series of secondary leads which would perform the function of the various transformers equally as well.

For simplicity, all output signals are shown as emerging on a single output connecting lead with the understanding that the signal is referenced to ground point 50. Also, in reference to the transformers, connecting leads between ground point 50 and the transformer windings are shown center tapped; however as a practical matter the connections do not necessarily have to be connected to the mid-point of the windings.

While we have shown and described the specific embodiment of this invention, the invention should not be limited to the particular form shown, and we intend in the appended claims to cover all modifications which do not depart from the spirit and scope of the invention.

What we claim is:

1. In apparatus of the class described: first condition responsive means; first signal producing means connected to said first condition responsive means; second condition responsive means; second signal producing means connected to said second condition responsive means; third condition responsive means; third signal producing means connected to said third condition responsive means; resolving means; fourth signal producing means producing a plurality of signals; means connecting said resolving means to said first, second, and said fourth signal producing means; differential means; fifth signal producing means; means interconnecting said first and fourth signal producing means; means connecting said first signal producing means to said differential means, and said third signal producing means; means connecting said second signal producing means to said differential means; first control means; means connecting said first control means to said differential means for adjusting said fifth signal producing means to a point where signals from said first, second, and fourth signal producing means are at a null value; second control means; means connecting said second control means to said fourth means for adjusting said fourth signal producing means to a point where signals from said first, second, and fourth signal producing means are at a null value; third control means; means connecting said third control means to said third condition responsive means for adjusting said third signal producing means to a point representative of said third condition; means connecting said third signal producing means to said fourth and first signal producing means; a plurality of output signal producing means; and means connecting at least one of said output signal producing means to each of said first, second, and third condition responsive means and said first and second control means to produce a plurality of output signals.

2. In apparatus of the class described: first condition responsive means including first signal producing means; second condition responsive means including second signal producing means; third condition responsive means including third signal producing means; converting means; fourth signal producing means producing a plurality of signals; means connecting said converting means to said first, second, and fourth signal producing means; means connecting said third signal producing means to said fourth and first signal producing means; difference means; fifth signal producing means; means interconnecting said first and fourth signal producing means; means connecting said first signal producing means to said difference means and said third signal producing means; means connecting said second signal producing means to said difference means; first control means for adjusting said fifth signal producing means to a point where the difference between signals from said second signal producing means, and combined signals from said first and fourth signal producing means are at a null value; means connecting said first control means to said difference means; second control means for adjusting said fourth signal producing means to a point representative of the ratio of a signal from said second signal producing means to the combined signals from said first and fourth signal producing means; means connecting said second control means to said converting means; third control means for adjusting said third signal producing means to a point representative of said third condition; means connecting said third control means to said third condition responsive means; a plurality of output signal producing means; and means connecting at least one of said output signal producing means to each of said first, second, and third condition responsive means and said first and second control means to produce a plurality of output signals.

3. Air data computing apparatus comprising: a static pressure sensor; a total pressure sensor; a first, second, third, and fourth plurality of signal producing means, each of said signal producing means having a stationary portion and a movable portion; excitation means; means connecting said excitation means to said stationary portions of said plurality of signal producing means; means connecting said movable portions of said first plurality of signal producing means to said static pressure sensor; means connecting said movable portions of said second plurality of signal producing means to said total pressure sensor; a resolver; means connecting said resolver to at least one of said movable portions of said first and second plurality of signal producing means; a first cam; a first motor-generator combination for positioning said first cam; means connecting said first cam, said movable portions of said third plurality of signal producing means, and said resolver to said first motor-generator; means connecting at least one of said movable portions of said third plurality of signal producing means to said stationary portions of at least three of said plurality of signal producing means; a differential transformer; a second cam for varying the mutual inductance of said differential transformer; a second motor-generator combination for rotating said second cam; means connecting said differential transformer to at least one movable portion of said first, and said second, plurality of signal producing means, and to said second motor-generator; and means connecting said second cam and said movable portions of said fourth plurality of signal producing means to said second motor-generator combination.

4. Air data computer apparatus comprising: a total pressure sensor; a static pressure sensor; a first, second, third, and fourth plurality of signal producing means, each of said signal producing means having a stationary portion and a movable portion; excitation means; means connecting said excitation means to said stationary portions of said plurality of signal producing means; means connecting said movable portions of said plurality of signal producing means to said static pressure sensor; means connecting said movable portions of said second plurality of signal producing means to said total pressure sensor; a resolver; means connecting said resolver to at least one of said movable portions of said first and second plurality of signal producing means; a first controller; means connecting said movable portions of said third plurality of signal producing means, and said resolver, to said first controller; means connecting at least one of said movable portions of said third plurality of signal producing means to said stationary portions of at least three of said first plurality of signal producing means; a differential transformer; a second controller for varying the mutual inductance of said differential transformer; means connecting said differential transformer to at least one movable portion of said first and second plurality of signal producing means, and to said second controller; and means connecting said movable portions of said fourth plurality of signal producing means to said second controller.

5. In apparatus of the class described: first condition responsive means including signal producing means; second condition responsive means including signal producing means; control means; means connecting said first and second condition responsive means to said control means; third signal producing means; means connecting said third signal producing means to said control means; means combining signal from said first condition responsive means and said third signal producing means; a plurality of output signal producing means for producing output signals indicative of deviations from variable reference values; a plurality of engageable connecting means; energizing means for energizing said plurality of engageable connecting means; means including said energizing means connecting at least one of said output signal producing means to each of said first condition responsive means and to said control means; and a plurality of repositioning means repositioning each of said output signal producing means to a predetermined position when said energizing means is deenergized.

6. In apparatus of the class described: first condition responsive means including signal producing means; second condition responsive means including signal producing means; servo-mechanism means; means connecting said first and second condition responsive means to said servo-mechanism means; third signal producing means; means connecting said third signal producing means to said servo-mechanism means; means combining signals from said first condition responsive means and said third signal producing means; first output signal producing means for producing output signals indicative of deviations from a first variable reference value; first engageable connecting means; second output signal producing means for producing output signals indicative of deviations from a second variable reference value; a second engageable connecting means; energizing means for energizing said first and second engageable connecting means; means including said energizing means connecting said first output signal producing means to said first condition responsive means and connecting said second signal producing means to said servo-mechanism means; and a plurality of repositioning means repositioning said first and second output signal producing means to a predetermined position when said energizing means is deenergized.

7. In apparatus of the class described: first condition responsive means including signal means; second condition responsive means including signal means; third means including signal means; means connecting said first and second condition responsive means to said third means; control means for adjusting said signal means of said third means to a point where signals from said first, second, and third means are at a null value; means connecting said control means to said third means; a first output signal means producing an output signal representative of a deviation from a given reference value of said first conditions; a second output signal means producing an output signal representative of a deviation from a given reference value which is proportional to a ratio of said first condition value to said second condition value; a pair of engageable connecting means for connecting said first output signal means to said first condition responsive means and for connecting said second output means to said control means; energizing means for energizing said pair of engageable connecting means; and a pair of repositioning means for repositioning said pair of signal means to a predetermined position when said energizing means is deenergized.

8. In apparatus of the class described: first condition responsive means; first signal producing means; means connecting said first condition responsive means to said first signal producing means; second condition responsive means; second signal producing means; means connecting said second condition responsive means to said second signal producing means; means for combining signals; means for connecting said first and second signal producing means to said means for combining signals; third signal producing means; means combining signals from said first and third signal producing means; differential means; means connecting said first and second signal producing means to said differential means; first control means for adjusting said differential means; means connecting said first control means to said differential means; a plurality of output signal producing means; means connecting at least one of said output signal producing means to said first control means; second control means for adjusting said third signal producing means; means connecting said second control means to said means for combining signals; and means connecting at least one of said output signal producing means to each of said first and second condition responsive means and said first and second control means to produce a plurality of output signals.

References Cited in the file of this patent

UNITED STATES PATENTS

| | | |
|---|---|---|
| 2,497,216 | Greenough | Feb. 14, 1950 |
| 2,636,151 | Hornfeck | Apr. 21, 1953 |
| 2,687,580 | Dehmel | Aug. 31, 1954 |
| 2,701,111 | Shuck | Feb. 1, 1955 |
| 2,714,309 | Redemske | Aug. 2, 1955 |
| 2,931,221 | Rusk | Apr. 5, 1960 |
| 2,959,958 | Savet | Nov. 15, 1960 |
| 3,002,382 | Gardner | Oct. 3, 1961 |
| 3,068,691 | Dion | Dec. 18, 1962 |

OTHER REFERENCES

Electronic Analog Computers (Korn & Korn), 1952, pages 234 and 235.